(12) United States Patent
Saitoh et al.

(10) Patent No.: US 7,235,272 B2
(45) Date of Patent: Jun. 26, 2007

(54) DRIP BAG

(75) Inventors: Mitsunori Saitoh, Osaka (JP); Fumio Miyahara, Osaka (JP)

(73) Assignee: Ohki Co., Ltd., Osaka-shi (JP)

( * ) Notice: Subject to any disclaimer, the term of this patent is extended or adjusted under 35 U.S.C. 154(b) by 601 days.

(21) Appl. No.: 10/484,106

(22) PCT Filed: Jul. 30, 2001

(86) PCT No.: PCT/JP01/06529

§ 371 (c)(1),
(2), (4) Date: Jan. 16, 2004

(87) PCT Pub. No.: WO03/011089

PCT Pub. Date: Feb. 13, 2003

(65) Prior Publication Data

US 2004/0168578 A1    Sep. 2, 2004

(51) Int. Cl.
*A47J 31/10* (2006.01)
(52) U.S. Cl. .............................. 426/82; 426/77; 99/323
(58) Field of Classification Search ............ 426/77–84, 426/433; 99/323, 306
See application file for complete search history.

(56) References Cited

U.S. PATENT DOCUMENTS 2,800,408 A * 7/1957 Fimple .......................... 426/80
3,215,533 A * 11/1965 Rambold ....................... 426/82
3,971,305 A * 7/1976 Daswick ....................... 99/295
4,519,911 A * 5/1985 Shimizu ....................... 210/478
4,584,101 A * 4/1986 Kataoka ....................... 210/474
4,715,271 A * 12/1987 Kitagawa ....................... 99/306

(Continued)

FOREIGN PATENT DOCUMENTS

EP    1050257    * 11/2000

(Continued)

*Primary Examiner*—Steve Weinstein
(74) *Attorney, Agent, or Firm*—Oliff & Berridge, PLC

(57) ABSTRACT

A drip bag is devised so that the good taste of coffee made by a conventional paper drip system can be obtained using a simple construction, and so that the drip bag can be set easily and securely on the cup even in cases where the thickness of the walls of the opening part of the cup is large. The drip bag includes a bag main body which is made of a water-permeable filtering sheet material and which has an opening part in the upper end portion of said bag main body, holding members which are made of a thin sheet-form material and which are disposed on the outside surfaces of two opposite sides of the bag main body, and reinforcing parts which are made of a thin sheet-form material and which are pasted to the outside surface of the bag main body around the peripheral parts of the holding members. Each of these holding members is formed from a tongue part which is pasted to the outside surface of the bag main body, an arm part which is located on the periphery of the tongue part, which is continuous with the lower end of the tongue part and which is formed so that said arm part can be pulled out from the bag main body, and a peripheral edge part of a specified shape, which is located on the periphery of the arm part and which is continuous with the central portion of the upper end of the arm part.

7 Claims, 5 Drawing Sheets

U.S. PATENT DOCUMENTS

| | | | | | | |
|---|---|---|---|---|---|---|
| 4,880,110 | A | * | 11/1989 | Walker | ............. | 206/0.5 |
| 5,132,124 | A | * | 7/1992 | Tamaki et al. | ............. | 426/82 |
| 5,318,786 | A | * | 6/1994 | Clarkson | ............. | 426/79 |
| 5,605,710 | A | * | 2/1997 | Pridonoff et al. | ............. | 426/86 |
| 5,842,408 | A | * | 12/1998 | Hatta | ............. | 99/323 |

FOREIGN PATENT DOCUMENTS

| | | | |
|---|---|---|---|
| JP | 3-218711 | * | 9/1991 |
| JP | U 6-62940 | | 9/1994 |
| JP | 8-10169 | * | 1/1996 |
| JP | 10-80362 | * | 3/1998 |
| JP | 10-85136 | * | 4/1998 |
| JP | 10-165309 | * | 6/1998 |
| JP | 10-216017 | * | 8/1998 |
| JP | 11-76064 | * | 3/1999 |
| JP | 11-178719 | * | 7/1999 |
| JP | 2000-197566 | * | 7/2000 |
| JP | 2000-211670 | * | 8/2000 |
| JP | 2000-279323 | * | 10/2000 |
| JP | 2001-46230 | * | 2/2001 |
| JP | B2 3166151 | | 3/2001 |
| JP | 2001-178629 | * | 7/2001 |

\* cited by examiner

FIG. 2A
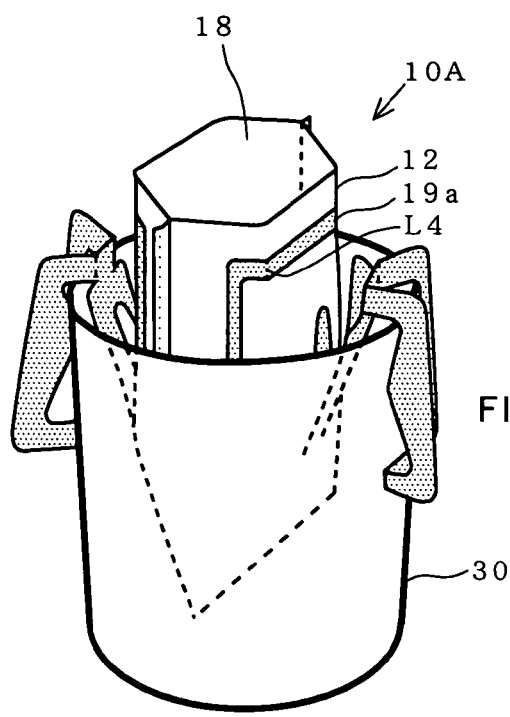
FIG. 2B
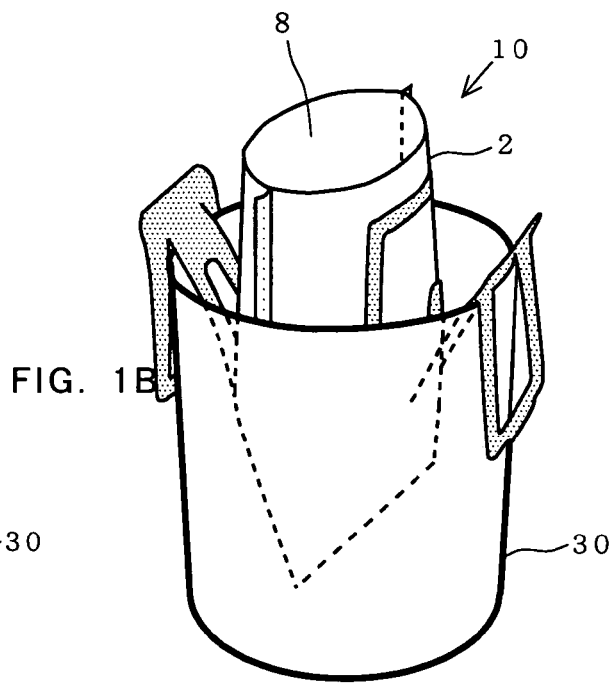
FIG. 1B

DRIP BAG

TECHNICAL FIELD

The present invention relates to a drip bag which is hooked to the top of a container such as a cup or the like, so that drip type coffee can easily be made.

BACKGROUND ART

Conventionally, a paper drip type coffee making method which allows the easy enjoyment of genuine coffee has been widely used. In this paper drip type coffee making method, coffee for several individuals (several cups) is ordinarily made at one time.

In recent years, there has been an increase in the number of people living alone, and the number of family members in a single family is decreasing because of a trend toward nuclear families and because of a drop in the birth rate. As a consequence, a disposable drip coffee bag for one person (hereinafter called a drip bag) which is used to facilitate the making of one cup of coffee is commonly seen on the market in various forms instead of the conventional paper drip system used mainly for making several cups of coffee.

In particular, drip bags that have a simple construction include drip bags comprising a bag main body consisting of a water-permeable filtering sheet in which ground coffee is placed, and a holding member made of paper or the like which is pasted to a side surface of the bag main body. This drip bag makes it possible to conserve the materials used to form the bag, and can be manufactured at low cost. Furthermore, a compact product can be produced.

However, this drip bag differs from a conventional paper drip system in that a dripper is immersed in the liquid coffee inside the cup during coffee percolation; accordingly, this may lead to dissatisfaction with the taste of the coffee in some cases. Furthermore, since the dripper is immersed in the hot liquid coffee, care must be taken when the dripper is cleared away following coffee percolation.

In contrast to this, the present inventors have proposed a drip bag having holding members of a specified shape, which makes it possible to obtain the good taste of coffee made by a conventional paper drip system, and which also has a simple construction, is extremely easy to set on the cup, shows a stable shape after being set on the cup, and is easily and safely disposable following coffee percolation (Japanese Patent No. 3166151).

FIG. 4A is a plan view of a coffee drip bag 10 in which his drip bag 1 is filled with ground coffee, the opening art at the upper end is closed, and a perforation is formed in the upper end portion. FIGS. 4B and 4C are explanatory diagrams showing the conditions of use.

This drip bag 1 comprises a bag main body 2, holding members 3 which are disposed on the outside surfaces of two opposite sides of the bag main body 2, and reinforcing parts 9 which are disposed on the outer peripheral portions of the holding members 3.

The holding members 3 are formed by forming cut lines in a thin sheet-form material such as paper, a plastic sheet or the like. Each of these holding members 3 comprises a peripheral edge part 4, an arm part 5 and a tongue part 6, with the tongue part 6 being pasted to the outside surface of the bag main body 2 (in the figures, the portion surrounded by the broken line p is the portion that is pasted). The lower end of the tongue part 6 and lower portion of the arm part 5 are continuous, and the upper end of the arm part 5 and upper portion of the peripheral edge part 4 are continuous.

When the coffee drip bag 10 is used, the bag is opened by cutting away the upper end portion of the bag main body 2 along the perforation 7. The peripheral edge parts 4 are pulled out as indicated by the arrow A (FIG. 4B); these peripheral edge parts 4 are then further pulled out in accordance with the diameter of the cup 30, and these parts are set on the cup side walls 31 (FIG. 4C).

As a result, the bag main body 2 is pulled in opposite directions from two opposite sides by the arm parts 5 as indicated by the arrows B, so that the bag main body 2 is suspended in the upper central portion of the cup 30 in a state in which the opening part 8 is opened wide. Furthermore, the reinforcing parts 9 prevent the front and back sheets that form the bag main body 9 from flexing so that the opening part 8 is closed. Moreover, the peripheral edge parts 4 pushes the outer surfaces of the cup side walls 31 in the direction indicated by the arrows C. As a result, the coffee drip bag 10 is fastened to the upper part of the cup 30 in an extremely stable state.

After the coffee drip bag 10 has thus been simply set on the cup 30 in an extremely stable state, good-tasting coffee can easily be obtained merely by pouring hot water via the opening part 8 as indicated by the arrows. Furthermore, disposal of the coffee drip bag 10 following coffee percolation can also be easily accomplished.

However, in the abovementioned coffee drip bag 10, although the walls 32 of the opening part of the cup 30 can be securely clamped by the peripheral edge parts 4 and arm parts 5 as shown in FIG. 5A in cases where the wall thickness of the opening part of the cup 30 is thin, these walls 32 cannot be firmly clamped by the peripheral edge parts 4 and arm parts 5 in cases where the walls 32 of the opening part of the cup 30 are thick as shown in FIG. 5B. As a result, the holding members 3 tend to slip from the cup 30 as indicated by the arrow.

The present invention is intended to solve such problems; an object of the present invention is to allow very easy and secure setting on the cup, and further stabilization of the shape of the drip bag following setting on the cup, even in cases where the walls of the opening part of the cup are thick, in a drip bag which is devised so that the good taste of coffee made by a conventional paper drip system can be obtained.

DISCLOSURE OF THE INVENTION

The present inventors discovered that by forming the holding members with a specified shape in a drip bag that comprises a bag main body consisting of a water-permeable filtering sheet and holding members consisting of a thin sheet-form material, it is possible to form parts in the peripheral edge parts of the holding members that will hook onto the walls of the opening part of the cup when the holding members are hooked onto the cup, so that the drip bag can be stably set on the cup even in cases where the walls of the opening part of the cup are thick.

Specifically, the present invention provides a drip bag which comprises:

a bag main body made of a water-permeable filtering sheet material having an opening part in the upper end portion;

holding members made of a thin sheet-form material disposed on the outside surfaces of two opposite sides of the bag main body; and reinforcing parts made of a thin sheet-form material pasted to the outside surface of the bag main body around the peripheral portions of the holding members;

wherein:
   each of the holding members comprises:
   a tongue part that is pasted to the outside surface of the bag main body;
   an arm part located on the periphery of the tongue part, which is formed so that said arm part is continuous with the lower end of the tongue part and so that said arm part can be pulled out form the bag main body; and
   a peripheral edge part located on the periphery of the arm part, which is continuous with the central portion of the upper end of the arm part; and
   each of the peripheral edge parts has hanging parts which are separated by cutting from the upper end of the arm part, and which extend in the horizontal direction, on both sides of the upper central portion of said peripheral edge part.

Furthermore, the present invention provides a coffee drip bag which is formed by filling the abovementioned drip bag with ground coffee, and closing the upper end of the bag main body.

BRIEF DESCRIPTION OF THE DRAWINGS

FIGS. 2A and 2B are explanatory diagrams which compare the open states during use of the coffee drip bag of the present invention and a conventional coffee drip bag;

BEST MODE FOR CARRYING OUT THE INVENTION

The drip bag of the present invention and a coffee drip bag formed by filling this drip bag with ground coffee will be described below in detail with reference to the attached figures. In the respective figures, the same symbols indicate the same or similar constituent elements.

Figure 1A:
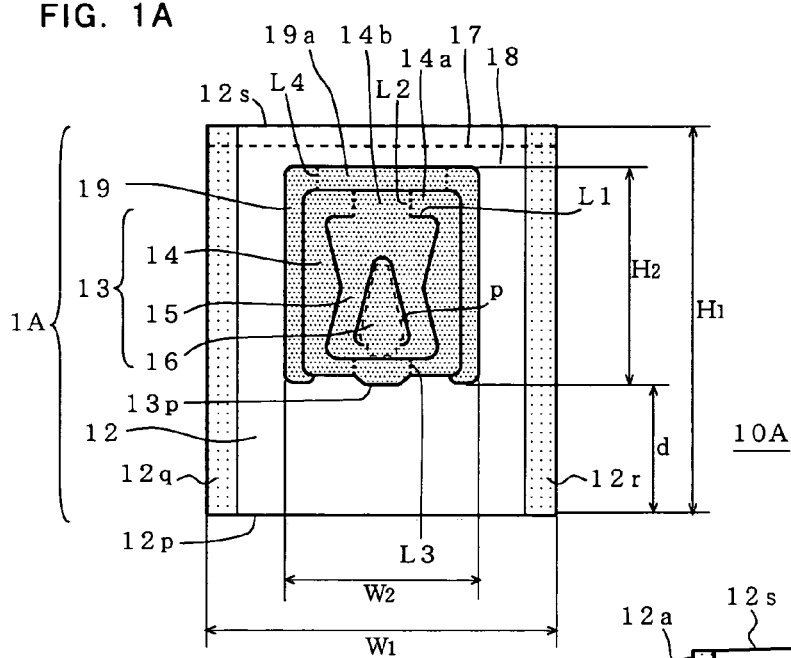
FIG. 1A is a plan view of the coffee drip bag of the present invention.
Figure 1B:
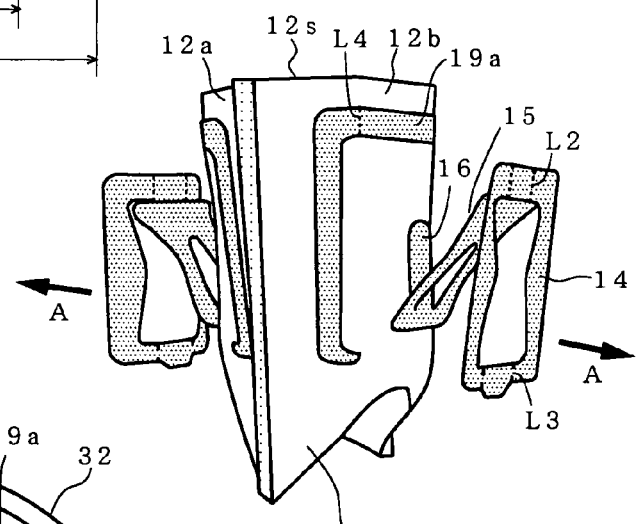
FIGS. 1B and 1C are respective explanatory diagrams of the conditions of use.
Figure 1C:
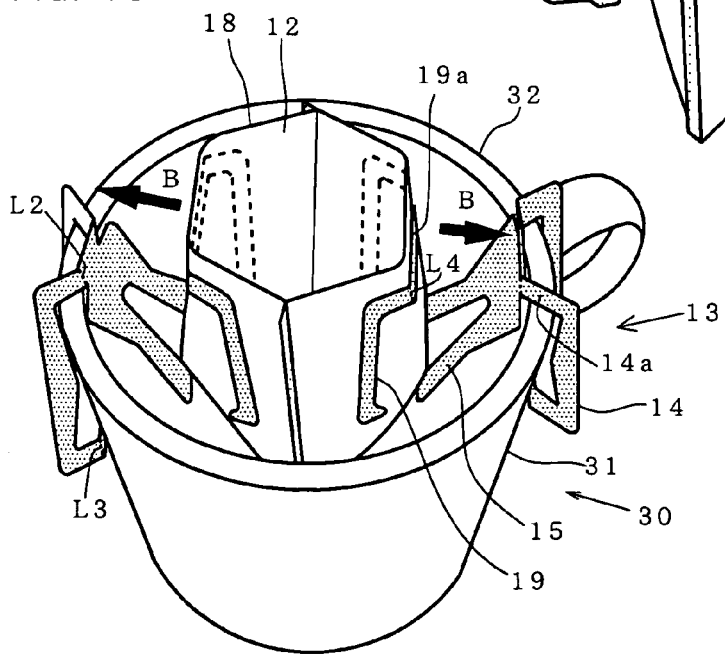

FIG. 1A is a plan view of one aspect of the coffee drip bag of the present invention, and FIGS. 1B and 1C are respective explanatory diagrams of the conditions of use.

This coffee drip bag 10A is prepared by filling a drip bag 1A constituting one aspect of the present invention with ground coffee, closing the opening part at the upper end of the bag, and forming a perforation 17 in the upper end portion of the bag.

The drip bag 1A comprises a bag main body 12 which consists of a water-permeable filtering sheet material, holding members 13 which are disposed on the outside surfaces of two opposite sides of the bag main body 12, and reinforcing parts 19 which are pasted to the outside surface of the bag main body on the outer peripheral portions of the holding members.

The bag main body 12 has two opposite rectangular faces, i. e., front and back rectangular faces 12a and 12b. For example, such a bag main body 12 can be formed by folding a single rectangular sheet in two so that the fold forms the bottom edge 12b of the rectangular faces 12a and 12b, and bonding both side edges 12q and 12r of the rectangular faces 12a and 12b, with the upper end portion 12s being left as an opening part.

Various types of materials which allow the percolation of coffee when the bag is filled with a specified amount of coffee and hot water is poured in may be used as the water-permeable filtering sheet material that forms the bag main body 12. For example, woven fabrics or nonwoven fabrics comprising synthetic fibers such as polyester, nylon, polyethylene, polypropylene, vinylon or the like, semi-synthetic fibers such as rayon or the like, or single or composite natural fibers such as paper mulberry, paper bush (Mitsumata) or the like; mixed papers comprising Manila hemp, wood pulp, polypropylene fibers or the like; and papers such as tea bag base paper or the like, may be used. Furthermore, a sheet material with a three-layer structure comprising a first layer made of polyester, a second layer made of a mixed paper of a regular polyester and a low-melting-point polyester, and a third layer comprising a melt-blown nonwoven fabric made of extremely fine fibers of polypropylene, is preferable in terms of taste, smell, flavor and percolation time as the abovementioned water-permeable filtering sheet material.

Furthermore, the holding members 13 are respectively disposed on the outside surfaces of the rectangular faces 12a and 12b on the front and back of the bag main body 12 in order to hook the bag main body 12 on the cup 30. These holding members 13 are formed from a thin sheet-form material such as paper, a plastic sheet or the like.

Each of the holding members 13 comprises a tongue part 16, an arm part 15 which is located on the periphery of the tongue part 16, and a peripheral edge part 14 which is located on the periphery of the arm part 15 and which forms the peripheral edge of the holding member 13. Here, the tongue part 16 is pasted to the outside surface of the bag main body 12 in the region surrounded by the broken line p. The arm part 15 is continuous with the lower end of the tongue part 16, and is formed so that said arm part 15 can be pulled out from the bag main body 12. Furthermore, the peripheral edge part 14 is continuous with the central portion of the upper end of the arm part 15.

In this drip bag 1A, a particular special feature is that the peripheral edge part 14 has hanging parts 14a which are separated by cutting from the upper end of the arm part 15 along the cut lines L1, and which extend in the horizontal direction, on both sides of the upper central portion of the peripheral edge part 14. Furthermore, fold lines L2 are formed between these hanging parts 14a and upper central portion 14b of the peripheral edge part 14, and fold lines L3 are also formed in the lower portion of the peripheral edge part 14 on extensions of the abovementioned fold lines L2.

Furthermore, the reinforcing parts 19 are located in positions that contact the holding members 13 in the areas above and to both sides of the holding members 13, and are pasted to the outside surface of the bag main body 12. If the reinforcing parts 19 are thus formed in positions contacting the holding members 13, the holding members 13 and reinforcing parts 19 can be formed easily and simultaneously at low cost, and with little waste of the thin sheet-form material, by stamping a single sheet of this thin sheet-form material. Accordingly, such a method is preferable.

Fold lines L4 which are used to fold the portion of each reinforcing part 19 that is positioned above the corresponding holding member 13, i. e., the strip-form portion 19a of the reinforcing part 19 that is disposed along the opening part 18 of the bag main body 12, to define a U shape are formed in said strip-form portion 19a.

There are no particular restrictions on the size of the reinforcing parts 19; however, if these parts are too small, the stability of the shape of the bag main body 12 drops when the coffee drip bag 10A is hooked on the cup 30 (see FIG. 1C. Accordingly, for example, in a case where the height H1 of the bag main body 12 is 70 to 100 mm and the width W1 is 65 to 85 mm, the height H2 of the holding members 13 is preferably 35 to 85 mm, and the width W2 is preferably about 35 to 75 mm.

The bonding positions of the holding members 13 on the bag main body 12 depend on the size of the holding members 13 relative to the bag main body 12; however, if these positions are too low, the stability of the bag main body 12 drops. Conversely, if these positions are too high, the lower portion of the bag main body 12 will be immersed in the brewed liquid coffee when the coffee drip bag 10A is hooked on the cup 30; in such a case, depending on the preference of the consumer, there may be instances in which this results in dissatisfaction with the taste of the coffee. Accordingly, the positions in which the holding members 13 are pasted to the bag main body are appropriately determined in accordance with the preferences of consumers targeted for this commercial product; ordinarily, however, it is preferable to set these positions so that the distance d between the lower edge 13p of each holding member 13 and the lower edge 12p of the bag main body 12 is approximately 10 to 25 mm.

In regard to the method whereby coffee is percolated using this coffee drip bag 10A, the bag main body 12 is first opened by cutting away the upper end portion of the bag main body 12 along the perforation 17. Then, as is shown in FIG. 1B, the peripheral edge parts 14 are pulled out as indicated by the arrow A. Next, as is shown in FIG. 1C, the peripheral edge parts 14 are further pulled out in accordance with the diameter of the opening part of the cup 30, and the peripheral edge parts 14 are hooked on the cup side walls 31. The peripheral edge parts 14 are then folded at the fold lines L2 and L3. After the coffee drip bag 10A has thus been set on the cup 30, hot water is poured in via the opening part 18 of the bag main body 12.

As a result of the coffee drip bag 10A thus being set on the cup 30, the hanging parts 14a of the peripheral edge part 14 are hooked so that these parts are carried on the walls 32 of the opening part of the cup 30, thus causing the holding members 13 to be hooked very stably on the cup 30. In this case, the bag main body 12 is pulled by the arm parts 15 in opposite directions from two opposite sides as indicated by the arrow B, so that the opening part 18 is opened wide. Furthermore, the shape of this opening is favorably maintained by the reinforcing parts 19, so that closing of the opening part 18 caused by flexing of the front and back rectangular faces 12a and 12b of the bag main body 12 is prevented. In particular, since the strip-form portions 19a of the reinforcing parts that are disposed along the opening part 18 of the bag main body 12 are folded at the fold lines L4 so that these strip-form portions 19a are formed into a U shape, the opening part 18 of the bag main body 12 can be opened wide even in cases where the diameter of the opening part of the cup 30 is small as shown in FIG. 2A.

In the case of a conventional coffee drip bag 10 which has no such fold lines in the reinforcing parts, on the other hand, as is shown in FIG. 2B, the degree of opening of the opening part 8 of the bag main body 2 is reduced in cases where the diameter of the opening part of the cup 30 is small.

Thus, in the case of this coffee drip bag 10A, the coffee drip bag 10A can be simply set on the cup 30 in an extremely stable state even in cases where the walls of the opening part of the cup 30 are thick. Furthermore, regardless of the size of the diameter of the opening part of the cup 30, the coffee drip bag 10A can be set on the cup 30 in a state in which the opening part 18 of the bag main body 12 is opened wide. Accordingly, the pouring of hot water during coffee percolation is facilitated.

Furthermore, if the holding members 13 are pasted to the bag main body 12 in relatively low positions, so that the bag main body 12 is located above the liquid level of the percolated liquid coffee following the percolation of the coffee, good-tasting coffee similar to that percolated using a conventional paper drip system can be made; moreover, disposal of the coffee drip bag 10A following coffee percolation is easy, and there is no danger of burns.

Furthermore, in the above description, an example was indicated in which the coffee drip bag 10A was set on the cup 30 after the coffee drip bag 10A was opened at the perforation 17. However, the method of use of the coffee drip bag 10A of the present invention is not limited to such a method; it would also be possible to open the coffee drip bag 10A after the coffee drip bag 10A has been set on the cup 30.

In the present invention, the holding members may have various configurations.

Figure 3A:
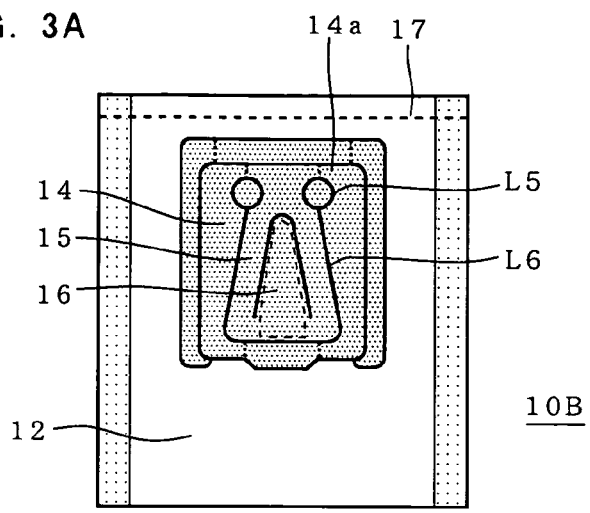
FIG. 3A is a plan view of a different embodiment of the coffee drip bag of the present invention.

Fore example, in order to form hanging parts 14a which are separated by being cut from the upper end of the arm part 15 and which extend in the horizontal direction on both sides of the upper central portions of the peripheral edge parts 14, it would also be possible to form circular cut lines L5 in the end portions of cut lines L6 that separate the peripheral edge parts 14 and arm parts 15 as shown in the coffee drip bag 10B shown in FIG. 3A, instead of forming the abovementioned cut lines L1.

Figure 3B:
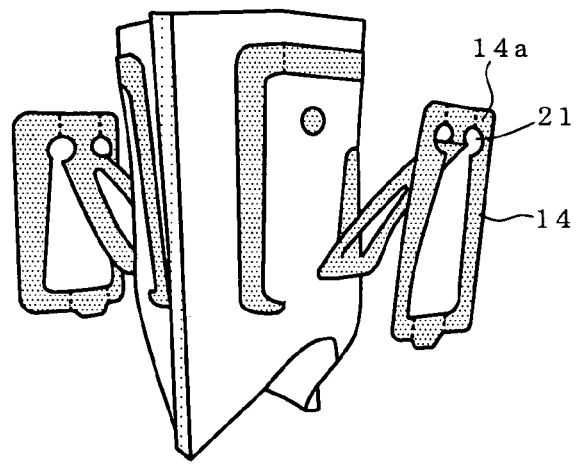
FIGS. 3B and 3C are respective explanatory diagrams of the conditions of use.
Figure 3C:
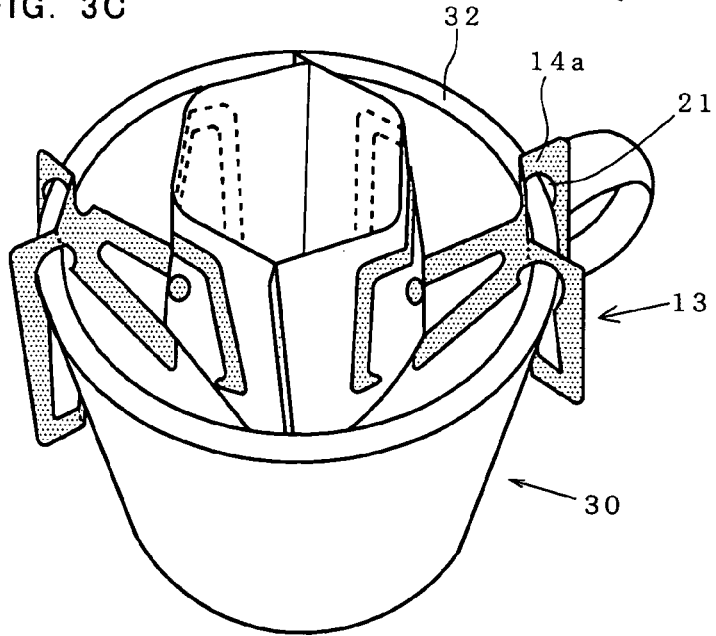
Figure 4A:
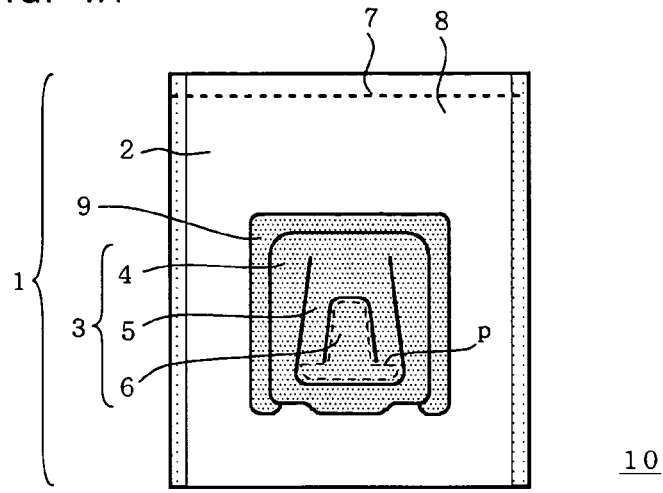
FIG. 4A is a plan view of a conventional coffee drip bag.
Figure 4B:
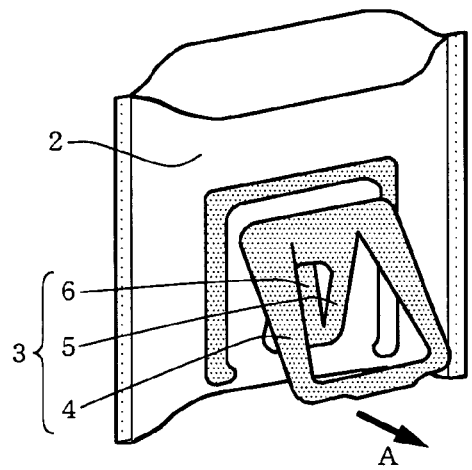
FIGS. 4B and 4C are respective explanatory diagrams of the conditions of use.
Figure 4C:
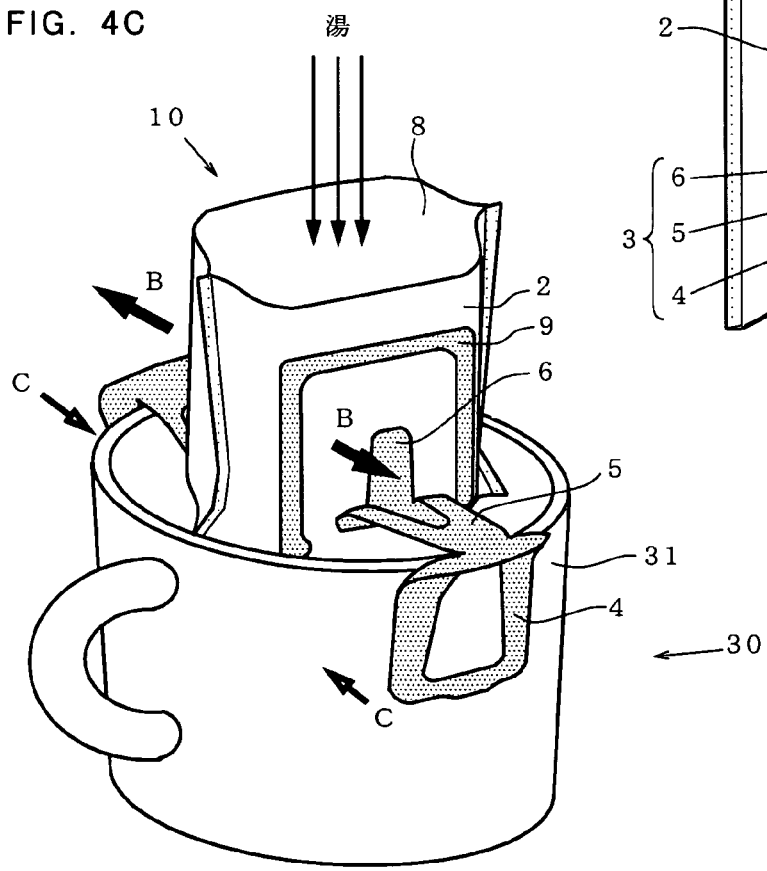
Figure 5A:
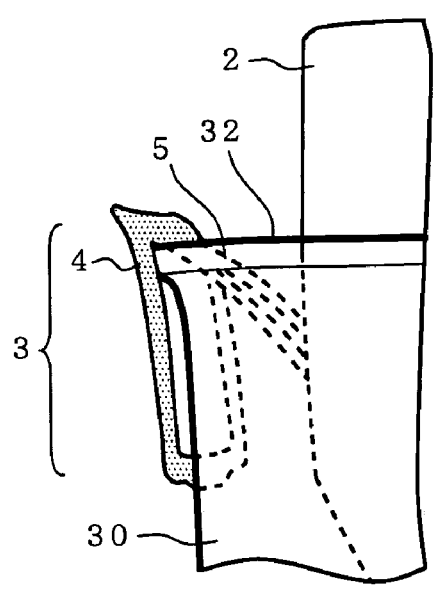
FIGS. 5A and 5B are explanatory diagrams illustrating a problem point in conventional coffee drip bags.
Figure 5B:
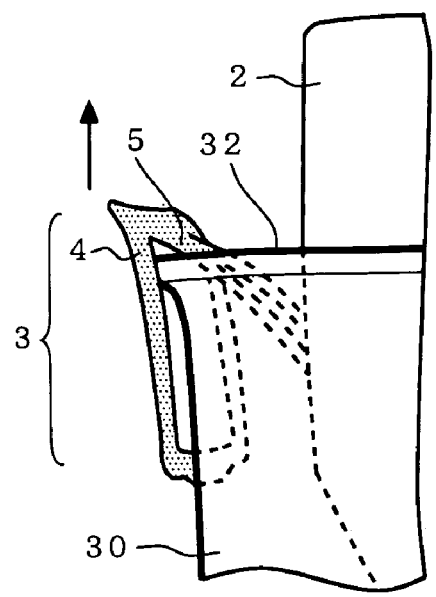

When the peripheral edge parts 14 of this coffee drip bag 10B are pulled out as shown in FIG. 3B, and the holding members 13 are set on the cup 30 as shown in FIG. 3C, holes 21 are formed on both sides of the upper central portion of each peripheral edge part 14, and the portions of each peripheral edge part 14 that are located above these holes 21 function as hanging parts 14a. Accordingly, even in cases where the walls 32 of the opening part of the cup 30 are thick, the coffee drip bag 10B can be set on the cup 30 in a stable state.

In addition, the perforation 17 formed in the upper end portion of the bag main body 12 in the coffee drip bags 10A and 10B of the present invention is formed in order to facilitate the opening of this part; however, instead of such a perforation 17, it would also be possible to seal this part by heat bonding to a degree that allows easy peeling of said part.

The positions and shapes of the reinforcing parts 19 are likewise not restricted to the abovementioned example; however, it is desirable to dispose these reinforcing parts 19 in a strip form along at least the opening part 18 of the bag main body 12 in order to stabilize the open state of the bag main body 12. Furthermore, it is desirable to form fold lines for folding the strip-form portions to define a U shape in the strip-form portions disposed along the opening part 18 of the bag main body 12 in order to insure that the degree of opening of the opening part of the bag main body is not reduced even in cases where the diameter of the opening part of the cup is small.

INDUSTRIAL APPLICABILITY

The drip bag of the present invention, and the coffee drip bag formed by filling this drip bag with ground coffee, can be very easily set on the cup regardless of the thickness of the walls of the opening part of the cup, and the shape of the bag following this setting is also stable. Furthermore, regardless of the size of the opening diameter of the cup, the opening part of the bag main body can be opened wide, so that the pouring of hot water is easy. Furthermore, if holding members are pasted to the bag main body in accordance with the preferences of consumers so that the lower end of the bag main body is positioned in the upper part of the cup when the bag is set on the cup, there will be no immersion of the bag main body in the percolation liquid coffee even after the coffee has been percolated. Accordingly, good-tasting coffee similar to that percolated using a conventional paper drip system can be made. Furthermore, as a result of this, disposal of the bag following coffee percolation is easier and safer.

The invention claimed is:

1. A drip bag for making a beverage and capable of being hooked to the rim of a container such as a cup, comprising;
   a bag main body made of a water-permeable filtering sheet material having an opening part in the upper end portion;
   holding members made of a thin sheet-form material disposed on the outside surfaces of two opposite sides of the bag main body, respectively; and
   reinforcing parts made of a thin sheet-form material pasted to the outside surfaces of the bag main body around the peripheral portions of each of the holding members, respectively;
   wherein:
   each of the holding members comprises:
   a tongue part that is pasted to the outside surface of the bag main body;
   an arm part located on the periphery of the tongue part, which is formed so that the lower portion of said arm part is continuous with the lower end of the tongue part and so that said arm part can be pulled out from the bag main body; and
   a peripheral edge part located on the periphery of the arm part; the upper portion of the peripheral edge part being continuous with the central portion of the upper end of the arm part so that said peripheral edge part can be pulled out, away from the bag main body, with continued pulling of said peripheral edge part causing said arm to be pulled out away from the bag main body; and
   each of the peripheral edge part has hanging parts which are separated by a cut line from the upper end of the arm part, and which extend in the horizontal, on both sides of the upper central portion of said peripheral edge part; and
   wherein each of said peripheral edge parts include upper vertical fold lines between each of the hanging parts and each upper central portion, and each of said peripheral edge parts also include fold lines in the lower portions of the peripheral edge parts in the same plane as the upper vertical fold lines, respectively, such that the hanging parts of the peripheral edge parts are capable of hooking onto the rim of a container.

2. The drip bag according to claim 1, wherein reinforcing parts are disposed in strip form along the opening part of the bag main body, and fold lines which are used to fold these strip-form portions to define a U shape are formed in said strip-form portions.

3. A coffee drip bag comprising the drip bag according to claim 2, and ground coffee contained in the bag main body, and wherein the opening part is closed.

4. The drip bag according to claim 1, wherein the holding members and reinforcing parts are formed by stamping a single sheet of a thin sheet-form material.

5. A coffee drip bag comprising the drip bag according to claim 4, and ground coffee contained in the bag main body, and wherein the opening part is closed.

6. A coffee drip bag comprising the drip bag according to claim 1, and ground coffee contained in the bag main body, and wherein the opening part is closed.

7. The coffee drip bag according to claim 6, wherein a perforation is formed in the upper end portion of the bag main body, so that opening of the opening part, when closed, is facilitated.

* * * * *